United States Patent [19]
Krautkremer

[11] 3,752,343
[45] Aug. 14, 1973

[54] MOVABLE CARRIER FOR A WATERCRAFT
[75] Inventor: Franz Krautkremer, Muhren, Germany
[73] Assignee: Schottel-Werft, Josef Becker KG, Spay/Rhein, Germany
[22] Filed: Sept. 13, 1971
[21] Appl. No.: 179,987

[30] Foreign Application Priority Data
Dec. 12, 1970 Germany .................. G 70 45 952.8
Mar. 22, 1971 Germany .................. G 71 10 776.1

[52] U.S. Cl. ............................. 214/505, 214/85.5
[51] Int. Cl. ............................................. B60p 3/10
[58] Field of Search ................. 214/505, 506.85.1, 214/84, 85.5; 280/414; 267/30, 31

[56] References Cited
UNITED STATES PATENTS
2,558,418   6/1951   Brueckman .......................... 214/84
2,659,595   11/1953  Coda ................................... 267/30
2,763,384   9/1956   Foster ................................. 214/84
2,834,492   5/1958   Roy, Sr. et al. ..................... 214/505
3,056,520   10/1962  Rutigliano .......................... 214/505
3,058,756   10/1962  Holsclaw ......................... 214/84 X
3,104,770   9/1963   Calkins et al. ................. 214/505 X
3,140,003   7/1964   Horner ............................. 214/505
3,167,198   1/1965   Echler et al. .................... 214/84 X Primary Examiner—Albert J. Makay
Attorney—Woodhams, Blanchard and Flynn

[57] ABSTRACT

A boat trailer having an intermediate carriage provided for receiving the boat thereon and movable with respect to the trailer frame. The boat trailer has a light weight frame which is mounted on a single axle which axle in turn is mounted to the trailer frame by leaf springs. Hollow rubber bumpers are interposed between the axle and the frame and vibration (shock) absorbers are also positioned between the wheel axle and the frame. A single support guide or rail extends centrally of the trailer frame and supports a carriage thereon for longitudinal movement with respect thereto. Said carriage supports the boat. A winch is provided on the carriage to draw the boat onto the carriage and the winch is provided on the trailer frame to draw the carriage onto the trailer frame.

5 Claims, 5 Drawing Figures

Patented Aug. 14, 1973

Inventor:
FRANZ KRAUTKREMER

BY
Woodhams, Blanchard & Flynn
ATTORNEYS

Patented Aug. 14, 1973

Inventor:
FRANZ KRAUTKREMER
BY
Woodhams, Blanchard & Flynn
ATTORNEYS

MOVABLE CARRIER FOR A WATERCRAFT

The invention relates to a movable carrier for a watercraft or the like with a frame supported on at least two axle mounted wheels.

The purpose of the invention is to transport a watercraft, particularly a motor boat, on a highway with a relatively high speed and safely. Further it is intended that the watercraft be both drawn onto and released from the carrier quickly and safely even under difficult conditions. This movement of the watercraft onto and off from the carrier must be made both possible and easy even where the carrier is a trailer and the pulling vehicle is not provided with a winch. Inasmuch as a trailer and the watercraft often travel into locations, such as at impassable terrain, it is necessary that the axle load be maintained as low as possible. All the foregoing relatively difficult conditions must further be realized, if possible, with a construction involving a minimum of cost if the resulting carrier is to have a wide public acceptance. In addition the carrier must be designed in such a manner that it will be free from sidewise swinging and the danger of overturning resulting therefrom.

The basic purpose of the invention is attained by providing the frame with a guide for a carriage or the like carrying the watercraft.

Further featureS of the invention include providing the frame with at least two longitudinal supports which are bent frontwardly to come together at a pulling eye or the like and which are connected to at least one cross-wise positioned brace. Thus, the longitudinal supports are constructed adjacent the wheels as substantially closed boxes and the remainder thereof are constructed as beveled open plate profiles, especially C- or U-profile. The servicing of the vehicle springs is made easier by the invention.

The objectives of obtaining a rigid and simultaneously light underframe is more effectively achieved by tapering the longitudinal supports both forwardly and backwardly from a reinforced zone in front of the wheels and by reinforcing with gusset plates the break points of the longitudinal supports.

Because of the high stresses which occur while driving across rough ground, a further feature of the invention is the supporting of the frame by a rigid axle on which in turn the wheels are supported by leaf springs. Such a construction can be made particularly advantageous by providing rubber bumpers between the axle and the frame. Such use of a rigid axle and the use of the leaf springs to effect lateral guidance, substantially increases the driving safety of a trailer. The rubber bumpers are relatively inexpensive, particularly if same are made in the form of hollow rubber units which increases the force absorbing capacity of the springs and provides a substantial cushioning effect for minimizing the disadvantageous effects of hard impacts. The combination of leaf springs and rubber hollow bumpers makes it possible to replace same easily and quickly before the leaf springs break and before the hollow rubber bumpers are damaged.

The driving characteristics particularly for cross-country driving are materially improved by providing vibration (shock) absorbing devices between the axle and the frame. Since in the above described combination the spring load deflection curve is of progressive nature, it is further advantageous to adjust the vibration (shock) absorbing devices for absorbing smaller compression forces than tension forces.

A further desirable feature of the movable carrier according to the invention consists in that the guide has a box-or U-shaped cross section between the longitudinal supports and is arranged tiltably about the rear edge of the frame and further in that the carriage is guided, though lockable, for longitudinally movement on the guide by means which laterally grip around the guide. In this manner, there is obtained a low trailer with a good position during driving on the highway or rough ground. Particularly also the watercraft is positioned safely on the carrier and can be launched quickly. The advantages of the invention are further improved in that the guide is tiltable about an axis supported in the frame.

To attain the above-described purpose the invention provides that a pulley block is mounted onto the frame or a part connected to the frame, the driving rope of said pulley block being connected to a winch and the roller or rollers of said pulley block being connected to the carriage. The following exemplary embodiment describes a one-roller pulley block. If the weight of the watercraft requires it, a multi-roller pulley block can also be provided.

In order that the winch can be mounted independently from the arrangement of the pulley block on the frame and thus the position most suitable for the handling of the winch can be chosen, the invention is further developed by providing on the frame at least one rope pulley which guides the rope connected to the winch. Thus it is also possible to arrange the pulley block and the winch in relationship to the frame in different planes in order to provide space to minimize hindrance to personnel.

The comfortable operation and quick handling of the winch is effected by so arranging the winch on the frame that the axis of rotation of the drum thereof is directed angularly to the normal to the longitudinal axis of the movable carrier. For the same reason a worm drive is preferably provided for the drive of the drum of the winch, the driving shaft of said worm drive being directed angularly to the longitudinal axis of the movable carrier.

In order that the watercraft can be moved quickly and with little effort onto the carriage, the invention further provides a wire-rope hand winch on the carriage or its guide, for example on the horn connected therewith, the rope of said wire-rope hand winch being securable to the watercraft. The wire-rope hand winch can be mounted advantageously if a deflection roller deflecting the rope is provided.

Furthermore it is advantageous for reasons described in connection with the exemplary embodiment if a support wheel is provided underneath the front part of the frame, which support wheel is adjustable in height by means of a winch and can be adjusted downwardly or upwardly.

The invention further provides that a spar or the like is received lockably into the guide, which spar can serve as an extension and an additional support during launching or loading of the watercraft.

Further advantages and characteristics of the invention will be apparent from the following description.

The invention is discussed in connection with exemplary embodiments illustrated in FIGS. 1 to 5.

Figure 1:
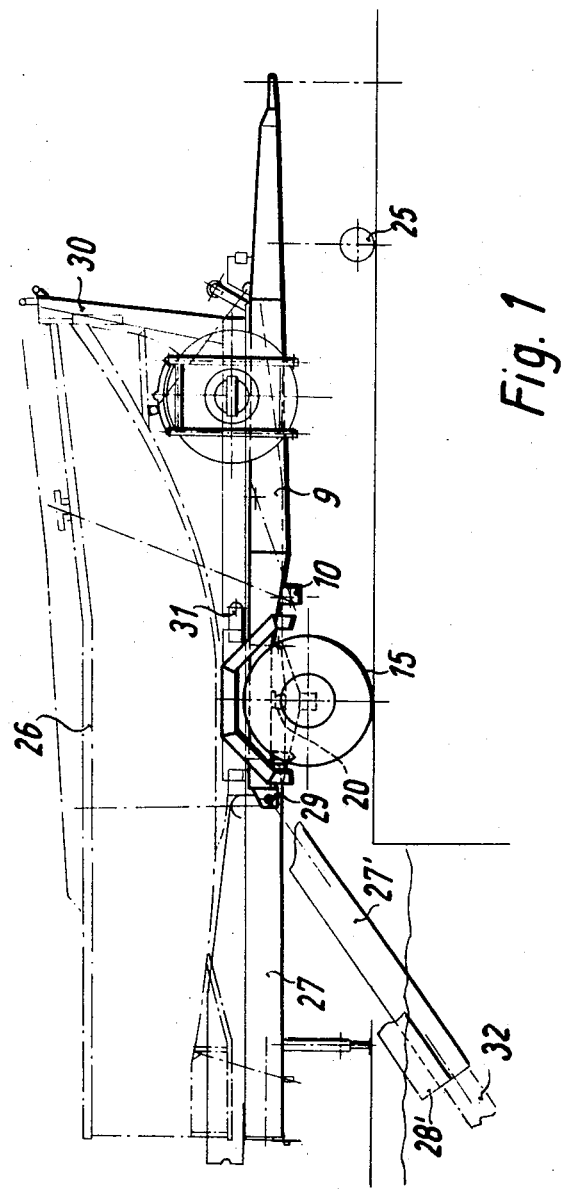
FIG. 1 illustrates a drivable carrier according to the invention with a motor boat loaded thereonto. The carriage is illustrated tilted downwardly in a partly alternative illustration.
Figure 2:
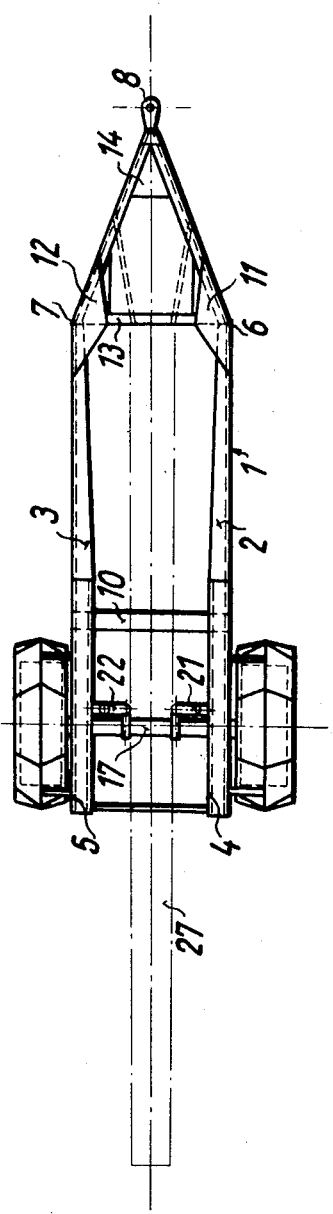
FIG. 2 is a top view of the movable carrier according to FIG. 1, without the motor boat.
Figure 3:
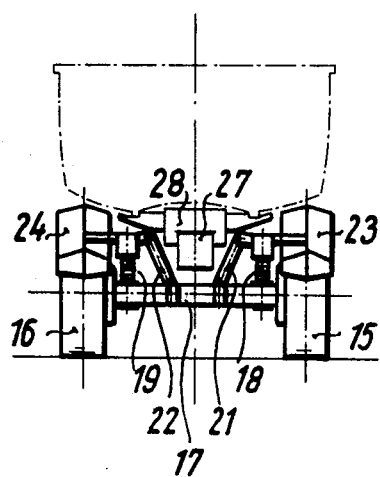
FIG. 3 is a rear view of the drivable carrier according to FIG. 1.
Figure 4:
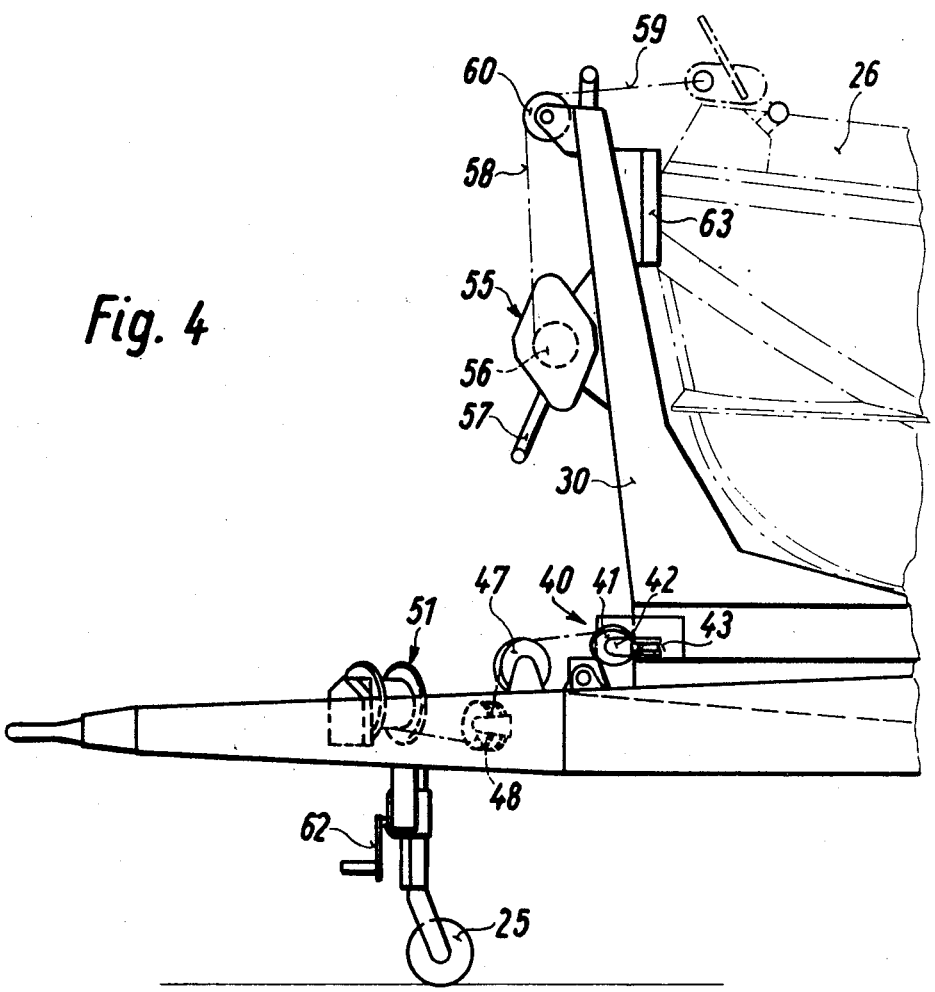
FIG. 4 is in an enlarged scale a different side view of the front part of the movable carrier, and showing a further development of the invention.
Figure 5:
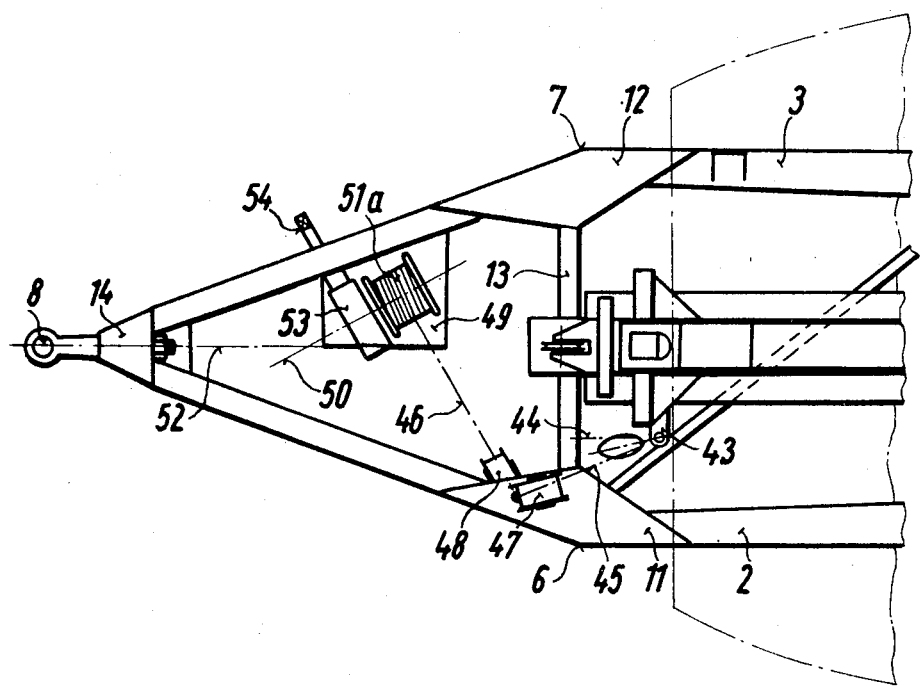
FIG. 5 is a top view of the front part of the drivable carrier according to FIG. 4.

The frame of the movable carrier of the invention consists substantially of two longitudinal supports 2 and 3 which are formed of beveled, open C or U-shaped plate profiles. The C or U-profiles are supplemented by weld plates 4,5 to form closed boxes in the rear part of the frame adjacent the axle which will be described later. The upper and lower legs of the longitudinal supports are according to the invention tapered forwardly up to the break points 6,7 from where they join at a pulling eye 8. The bar 9 which is provided between the legs of the U-profile tapers forwardly and backwardly from a point positioned ahead of the axle so that the supports are constructed rigidly and at the same time of minimum weight. The two longitudinal supports are held apart by a cross-piece 10 in the rear portion of the frame. The longitudinal supports are reinforced by gusset plates 11,12 at the break points 6 and 7. A further cross-piece 13 or the like is advantageously inserted between the break points. The frame at the pulling eye 8 is also reinforced by a gusset plate 14. A continuous axle 17 is provided in the rear zone of the frame for supporting the wheels 15,16. The frame is supported on the axle with high-progressive leaf springs 18,19. Rubber bumpers, advantageously hollow rubber bumpers 20, are inserted between the frame and the leaf springs. In addition, vibration (schock) absorbers 21,22 are provided between frame and axle. Since, as has already been mentioned, the spring load deflection curve extends progressively, the vibration absorbers are adjusted to provide only a very small capacity to absorb compressive forces while they have a greater capacity to absorb tensile forces. The force-absorption of the cushioning system is increased by the presence of the hollow rubber bumpers and at the same time the spring deflection at very strong impacts is limited. Before springs break because of an overload, the rubber bumpers are destroyed and these can be replaced easily and quickly. The wheels are covered by fenders 23,24 in the conventional manner.

A guide 27 on which a carriage 28 carrying the motor boat can slide is provided for receiving the watercraft, in the example, the motor boat. The carriage embraces the guide at its sides so that this support device with only a small lateral dimension still provides a safe sliding guide. The guide is mounted to the frame by any convenient known means. An important feature of the invention is that the guide is located between the longitudinal supports so that the movable carrier or trailer has a desirable roadability. The rear part of the guide can be tilted downwardly about an axis 29 supported in the frame so that the carriage 28 with the motor boat thereon can slide off rearwardly and downwardly. A horn 30 is provided for holding the watercraft or motor boat in loaded position, which horn is connected to the carriage or its guide. In the example the horn is connected to the guide. In loaded condition, the carriage is fixed to the guide by means of locks. A spar 32 or the like is guided telescopically removably and lockably in the guide, which spar can serve as an additional support during launching or reloading of the watercraft.

A pulley block 40 is provided for pulling the carriage. The roller 41, or the axis of the pulley block, is connected to an eye 43 by means of a strap 42 with a not illustrated bolt. The eye is connected to the carriage. The end 44 of the rope is secured to the cross-piece 13 while the running portions 45, 46 are led over two rope pulleys 47,48 to a winch 51. The guide of the rope and the arrangement of the rollers and the winch is carried out in such a manner that there is no hindrance to the operating personnel who might stand on the frame, for example in order to operate a later described wire-rope hand winch. The winch 51 for the pulley block is fixed to the frame by means of a supporting plate 49 in such a manner that the axis of rotation 50 of the drum 51a is directed angularly to the normal or to the perpendicular line on the longitudinal axis 52 of the movable carrier or frame. However, the axis of rotation does not intersect the longitudinal axis at a right angle. The winch is driven by a worm drive comprising a worm and a worm gear, only the housing 53 of such worm drive being illustrated. A hand crank for driving the worm drive can be placed on the driving shaft 54 thereof. A wire-rope hand winch 55 is secured to the horn 30. The drum 56 of said wire-rope hand winch can be driven by a crank 57. The rope 58,59 runs over a deflection roller 60 which is also secured to the horn and can be secured to the watercraft 26 by a suitable fastening means, for example hook or shackle.

The movable carrier or trailer is provided in front with a support wheel 25 and in back with a parking support 61. The support wheel can be vertically adjusted by a winch 62 in order to balance the different heights of the trailer couplings. Further, it can be tilted upwardly.

On the side facing the watercraft, the horn is provided with a buffer 63 in order to permit rapid positioning of the watercraft onto the carriage without damaging the forward end of the watercraft.

The embodiments of the invention in which an exclusive property or privilege is claimed are defined as follows:

1. In a watercraft launching and loading trailer having frame means and a pair of axially spaced supporting wheel means mounted on said frame means, the combination comprising:

longitudinally extending guide means mounted on said frame, said guide means having a box or U-shaped cross section and a rearward portion selectively hingeably mounted for movement about a horizontal axis;

carriage means movably mounted on said guide means for longitudinal movement therealong, said carriage means being adapted to support said watercraft thereon while stationary on said guide means and while moving therealong;

winch means mounted on said frame;

pulley means mounted on said carriage means and movable therewith; and cable means secured at one end to said frame means and extends in engagement with said pulley means on said carriage means and thence to said winch means.

2. The combination according to claim 1, wherein said frame means consists substantially of two horizontally spaced longitudinally extending supports connected at the forward end to define a pulling eye and at least one cross piece connected to and extending between said supports rearwardly from said pulling eye, said supports adjacent said wheel means having a closed box cross section, the remainder of said supports forwardly of said wheel means having an open C-shaped or U-shaped plate profile, the edges of said plate profile being tapered from a relatively wide width adjacent said wheel means to a narrower width adjacent the front of said trailer.

3. The combination according to claim 1, including second pulley means on said frame means between said winch means and said first mentioned pulley means on said carriage means for guiding said cable means; and wherein said winch means comprises a rotatable drum adapted to have said cable means wound and unwound therefrom, the axis of rotation of said drum being at an angle to the longitudinal axis of said trailer.

4. The combination according to claim 1, including support wheel means secured beneath said frame means adjacent the front part of said frame means, said support wheel means including lift means for altering the height of said front part of said trailer, said support wheel means being adapted for movement to a tilting position.

5. The combination according to claim 1, including a spar telescopingly mounted to said guide means and defining an extension of said guide means when in the extended position.

* * * * *